US011402951B2

(12) United States Patent
Eto et al.

(10) Patent No.: US 11,402,951 B2
(45) Date of Patent: Aug. 2, 2022

(54) INPUT DEVICE AND VEHICLE

(71) Applicant: Panasonic Intellectual Property Management Co., Ltd., Osaka (JP)

(72) Inventors: Hideaki Eto, Osaka (JP); Takeshi Masutani, Osaka (JP); Kai Masamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 30 days.

(21) Appl. No.: 16/951,668

(22) Filed: Nov. 18, 2020

(65) Prior Publication Data

US 2021/0157425 A1 May 27, 2021

(30) Foreign Application Priority Data

Nov. 27, 2019 (JP) .............................. JP2019-214132
Jun. 5, 2020 (JP) .............................. JP2020-098744

(51) Int. Cl.
 *G06F 3/01* (2006.01)
 *G06F 3/044* (2006.01)
 *G05G 5/03* (2008.04)
 *F16H 59/10* (2006.01)

(52) U.S. Cl.
 CPC .............. *G06F 3/044* (2013.01); *G05G 5/03* (2013.01); *G06F 3/016* (2013.01); *F16H 59/10* (2013.01)

(58) Field of Classification Search
 CPC .......... G06F 3/044; G06F 3/016; G06F 3/041; G06F 3/0412; G06F 3/0414; G05G 5/03
 See application file for complete search history.

(56) References Cited

U.S. PATENT DOCUMENTS

2011/0277578 A1\* 11/2011 McGuire ............. F16H 59/0278
 74/473.3
2014/0118127 A1 5/2014 Levesque et al.
2020/0117298 A1\* 4/2020 Hsu ...................... H03K 17/964

FOREIGN PATENT DOCUMENTS

JP 2012-033429 2/2012
JP 2014-112357 6/2014

\* cited by examiner

*Primary Examiner* — Robert J Michaud
(74) *Attorney, Agent, or Firm* — Greenblum & Bernstein, P.L.C.

(57) ABSTRACT

An input device includes: an inputter to which an operation is input by a user; a frame that holds the inputter and moves in a first direction in response to the operation input by the user; a substrate disposed on a side to which the frame moves in the first direction; a first elastic body disposed between the frame and the substrate; a load sensor that detects a load applied to the inputter, based on the movement of the frame in the first direction; a restrictor that restricts the movement of the frame in a second direction that is opposite to the first direction; and a second elastic body disposed between the restrictor and the movable portion. The second elastic body has a repulsion elasticity lower than a repulsion elasticity of the first elastic body.

20 Claims, 11 Drawing Sheets

< When pressed slowly>

<When pressed quickly>

INPUT DEVICE AND VEHICLE

CROSS REFERENCE TO RELATED APPLICATIONS

The present application is based on and claims priority of Japanese Patent Application No. 2019-214132 filed on Nov. 27, 2019 and Japanese Patent Application 2020-098744 filed on Jun. 5, 2020.

FIELD

The present disclosure relates to an input device and a vehicle.

BACKGROUND

Patent Literature (PTL) 1 discloses a haptic effect enabled device (input device) that provides a tactile sensation to a user's finger based on an input of a touch on the surface of an interface device that is a touch pad.

CITATION LIST

Patent Literature

PTL 1: Japanese Unexamined Patent Application Publication No. 2014-112357

SUMMARY

However, the input device disclosed in PTL 1 can be improved upon.

In view of this, the present disclosure provides an input device capable of improving upon the above related art.

An input device according to one aspect of the present disclosure includes: an inputter to which an operation is input by a user; a movable portion that holds the inputter and moves in a first direction in response to the operation input by the user; a substrate disposed on a side to which the movable portion moves in the first direction; a first elastic body disposed between the movable portion and the substrate; a load sensor that detects a load applied to the inputter, based on the movement of the movable portion in the first direction; a restrictor that restricts the movement of the movable portion in a second direction that is opposite to the first direction; and a second elastic body disposed between the restrictor and the movable portion, wherein the second elastic body has a repulsion elasticity lower than a repulsion elasticity of the first elastic body.

A vehicle according to one aspect of the present disclosure includes: the above-described input device; and onboard equipment that is operated in response to an input to the input device.

With the input device and the like according to one aspect of the present disclosure, it is possible to improve upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
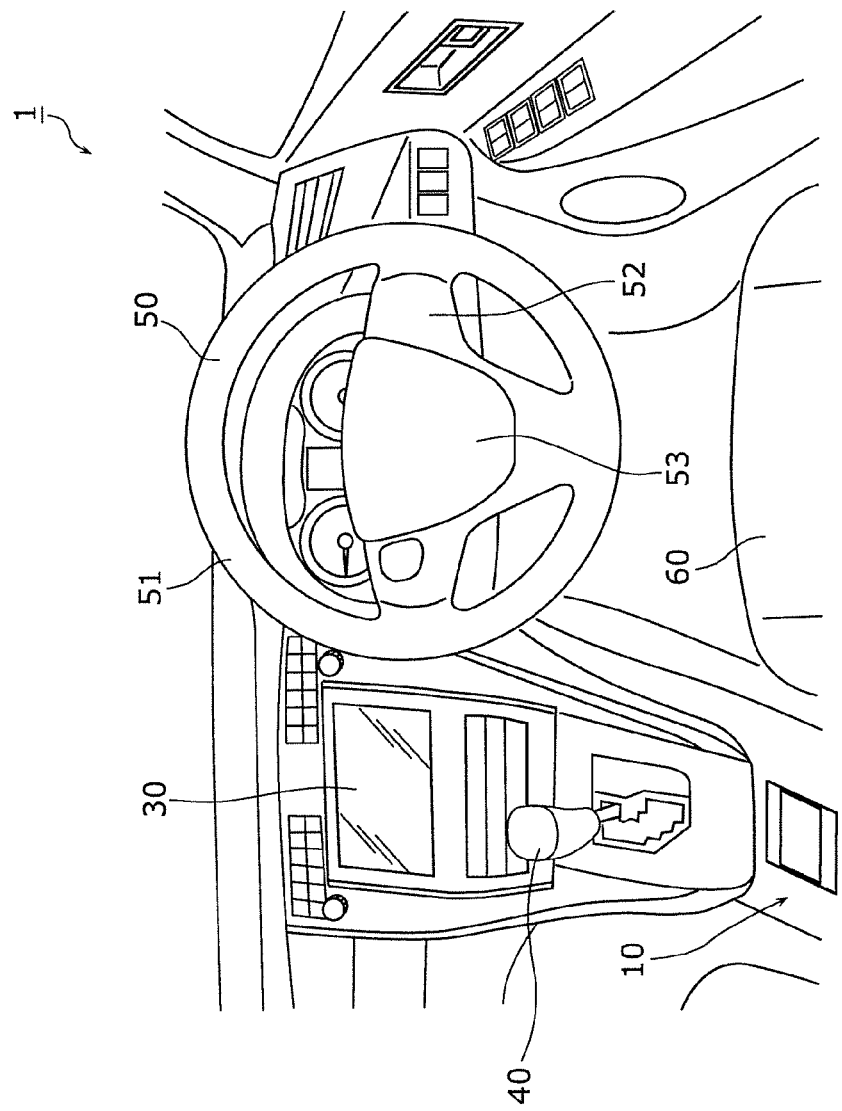
FIG. 1 is a diagram showing an example of a configuration of a cabin of a vehicle in which an input device according to an embodiment is disposed.

DESCRIPTION OF EMBODIMENTS (Underlying Knowledge Forming the Basis of the Present Disclosure)

The input device described in "background" section may be required to be configured to reduce the amount of pressure applied by the user to press the touch pad (so-called stroke amount reduction). However, PTL 1 does not disclose a technique that addresses the stroke amount reduction.

Accordingly, the inventors of the invention of the present application conducted in-depth studies on, as an example of further improvement of the input device, an input device and the like, with which the stroke amount reduction can be achieved, and conceived an input device and the like described below.

An input device according to one aspect of the present disclosure includes an inputter to which an operation is input by a user; a movable portion that holds the inputter and moves in a first direction in response to the operation input by the user; a substrate disposed on a side to which the movable portion moves in the first direction; a first elastic body disposed between the movable portion and the substrate; a load sensor that detects a load applied to the inputter, based on the movement of the movable portion in the first direction; a restrictor that restricts the movement of the movable portion in a second direction that is opposite to the first direction; and a second elastic body disposed between the restrictor and the movable portion, wherein the second elastic body has a repulsion elasticity lower than a repulsion elasticity of the first elastic body.

With this configuration, in a state in which the inputter does not receive an operation from the user, the second elastic body is compressed by receiving a stress in the second direction due to the elastic force of the first elastic body. Accordingly, the movable portion does not apply an unnecessary load in the first direction in the state in which the inputter does not receive an operation from the user, and thus the preload is stabilized. Thus, in the input device, variations in the pressure range that is detectable by the load sensor can be suppressed, as a result of which, there is a possibility that the stroke amount reduction can be achieved.

Also, for example, the input device may further include: a casing that pivotally supports one end of the movable portion, and the second elastic body may be disposed between the restrictor and another end of the movable portion.

With this configuration, in the input device configured such that the movable portion pivots, the stroke amount reduction can be achieved.

Also, for example, the movable portion may be pressed in the first direction in response to the operation input by the user, and the second elastic body may be disposed between each of one end and another end of the movable portion and the restrictor.

With this configuration, in the input device configured such that the movable portion is pressed, the stroke amount reduction can be achieved.

Also, for example, the input device may further include a tactile sensation provider that provides a tactile sensation to the user via the inputter when the load sensor detects a load of a predetermined value or more.

With this configuration, the tactile sensation is provided to the user from the tactile sensation provider based on the operation input to the inputter by the user, and thus, upon receiving the tactile sensation, the user can know that the operation has been received. Accordingly, with the input device, it is possible to reduce the degree of dependence on the visual sensation to determine the position when operating the equipment. Accordingly, even when the user is operating the equipment while performing a different task, the user can easily operate the equipment with high accuracy.

Also, for example, the tactile sensation may include vibrations, and the tactile sensation provider may include a vibration generator that generates the vibrations.

With this configuration, the user can know, based on the form of vibrations (for example, based on whether or not vibrations have been generated), whether or not the operation input to the inputter has been received. Also, the user can experience a tactile sensation (shape and texture) as if the user was touching the real object.

Also, for example, the input device may further include: a controller that is electrically connected to the load sensor and the tactile sensation provider, and the controller may disable an output from the load sensor during a period in which the tactile sensation provider is providing the tactile sensation.

With this configuration, the controller can disable the input to the load sensor based on the vibrations of the tactile sensation provider itself, and thus the input (for example, chattering) to the load sensor based on an unexpected movement of the finger due to the vibrations is suppressed, as a result of which, the occurrence of an erroneous operation can be reduced.

Also, for example, the controller may enable the output from the load sensor after a predetermined period passes from a time when the tactile sensation provider finishes providing the tactile sensation.

With this configuration, the input device disables (ignores) the output from the load sensor for a predetermined period after the tactile sensation provider finishes providing the tactile sensation, and thus it is possible to suppress the occurrence of an erroneous operation caused by the input based on unnecessary chattering of the finger when the tactile sensation provider stops providing the tactile sensation.

Also, for example, the inputter may include a touch panel that detects an operating position of the operation input to the inputter by the user.

With this configuration, the input device can detect a position (touch point) of the operation input to the inputter by the user. In the case where the input device receives an operation input to the equipment, the equipment is controlled according to the touch point detected by the input device, and thus the convenience of the input device is improved.

Also, for example, the load sensor may be a stroke sensor that detects a displacement of the first elastic body.

With this configuration, the input device can be implemented using a versatile sensor such as a stroke sensor, and thus the input device can be easily produced.

Also, for example, the first elastic body may be disposed to overlap the load sensor in a plan view from the first direction, and the input device may further include a third elastic body that is disposed at a position that does not overlap the load sensor in the plan view and is thicker than the first elastic body.

With this configuration, the load applied to the load sensor can be suppressed, and thus even if a load higher than or equal to the maximum detection load of the load sensor is applied to the inputter, the load sensor can detect the load.

Also, for example, the first elastic body and the third elastic body may be integrated as a single body.

With this configuration, the number of components of the input device and the number of steps of assembling the input device can be reduced. Accordingly, the cost of the input device can be suppressed, and the productivity of the input device can be further enhanced.

Also, a vehicle according to one aspect of the present disclosure includes: the input device described above; and onboard equipment operated in response to an input to the input device.

With this configuration, the above-described input device in which the stroke amount reduction can be achieved can be used as an input device for a vehicle.

Generic or specific aspects of the present disclosure may be implemented by a system, a method, an integrated circuit, a computer program or a computer readable non-transitory recording medium such as a CD-ROM, or may be implemented by any combination of a system, a method, an integrated circuit, a computer program and a recording medium. The program may be stored in advance in the recording medium, or may be supplied to the recording medium via a wide area communication network including the Internet and the like.

Hereinafter, an embodiment will be described specifically with reference to the drawings.

Note that the embodiment described below shows a generic or specific example of the present disclosure. Accordingly, the numerical values, shapes, materials, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements. In addition, the diagrams are schematic representations, and thus are not necessarily true to scale. Also, in the diagrams, structural elements that are the same are given the same reference numerals.

Also, in the specification of the present application, the terms that describe the relationship between elements such as "match" and "equal" and the terms that describe the shape of elements such as "plate-like shape", "rectangular frame shape", and "L-shape", as well as numerical values are expressions that not only have a strict meaning but also encompass a substantially equal range, for example, a margin of about several percent.

Also, hereinafter, an example will be described in which the input device according to the present disclosure is mounted on a vehicle. Accordingly, the directions such as front direction, rear direction, right direction, and left direction are defined relative to the traveling direction of the vehicle. Likewise, the directions such as upward direction, downward direction, horizontal direction, and vertical direction are defined relative to a state in which the wheels of the vehicle are on the ground.

Also, in the diagrams that are referred to in the following description of the embodiment, coordinate axes may be shown. The minus side of the Z axis represents the downward direction, and the plus side of the Z axis represents the upward direction. The X axis direction and the Y axis direction are directions that are orthogonal to each other on a plane perpendicular to the Z axis direction. The X-Y plane is a plane parallel to the ground. Also, in the embodiment given below, the expression "in a plan view" means that the representation is seen from the Z axis direction.

Embodiment

[1. Configuration of Input Device]

Input device 10 according to the present embodiment and a configuration of a cabin of a vehicle in which input device 10 is disposed will be described first with reference to FIG. 1. FIG. 1 is a diagram showing an example of the configuration of the cabin of the vehicle in which input device 10 according to the present embodiment is disposed.

In the cabin of automobile 1 (an example of the vehicle) shown in FIG. 1, onboard equipment (not shown) and input device 10 are mounted. In the cabin of automobile 1, furthermore, shift lever 40, steering wheel 50, and seat 60 are disposed.

Input device 10 is a device that is used to perform input of an operation to control the equipment mounted on automobile 1 and that also applies stimulation to the user who is operating input device 10 according to the input operation. A detailed description of input device 10 will be given later.

In the cabin of automobile 1, input device 10 is disposed at a position where, in a state in which the user who is an occupant of automobile 1 is sitting on seat 60 of automobile 1, the user can reach input device 10 with his/her hand, excluding steering wheel 50. For example, as shown in FIG. 1, input device 10 is disposed on the rear side of shift lever 40. The user who is a driver operates the onboard equipment by inputting, using his/her left hand, an operation to an inputter (inputter 19 shown in FIG. 2) of input device 10 disposed on the rear side of shift lever 40.

The onboard equipment is equipment that is mounted on a vehicle such as automobile 1, and includes, for example, an automotive navigation system, audio equipment for reproducing an optical disc, video reproduction equipment, and the like. The onboard equipment includes display 30. Display 30 displays a map for automotive navigation, a reproduced video image, a UI for operating the onboard equipment, a UI for controlling another onboard equipment, and the like. Display 30 may be implemented by, for example, a liquid crystal display, an organic EL (Electro Luminescent) display, or the like. Also, a configuration may be used in which the onboard equipment is connected to a speaker (not shown) to output sound to the speaker. The other onboard equipment may be, for example, air conditioning equipment or the like, and may be configured such that the operations of the air conditioning equipment are controlled by inputting operations to the input device.

Input device 10 is a device that is used to input an operation to operate a UI (User Interface) displayed on display 30 of the onboard equipment and that also applies stimulation to the user who is operating input device 10 according to the input operation.

Steering wheel 50 is provided to steer automobile 1, and includes ring-shaped rim 51, substantially T-shaped spoke 52 that is formed unitarily with the inner circumferential surface of rim 51, and horn switch cover 53 that covers a horn switch (not shown) disposed at the center of spoke 52.

In FIG. 1, an example is shown in which automobile 1 is a right-hand drive vehicle, but automobile 1 may be a left-hand drive vehicle. In this case, the configuration is the same except that right and left are interchanged, and thus the configuration of automobile 1 that is a right-hand drive vehicle can be applied. Also, automobile 1 may be a self-driving vehicle that controls the driving of the vehicle, without requiring operations of the driver.

Figure 2:
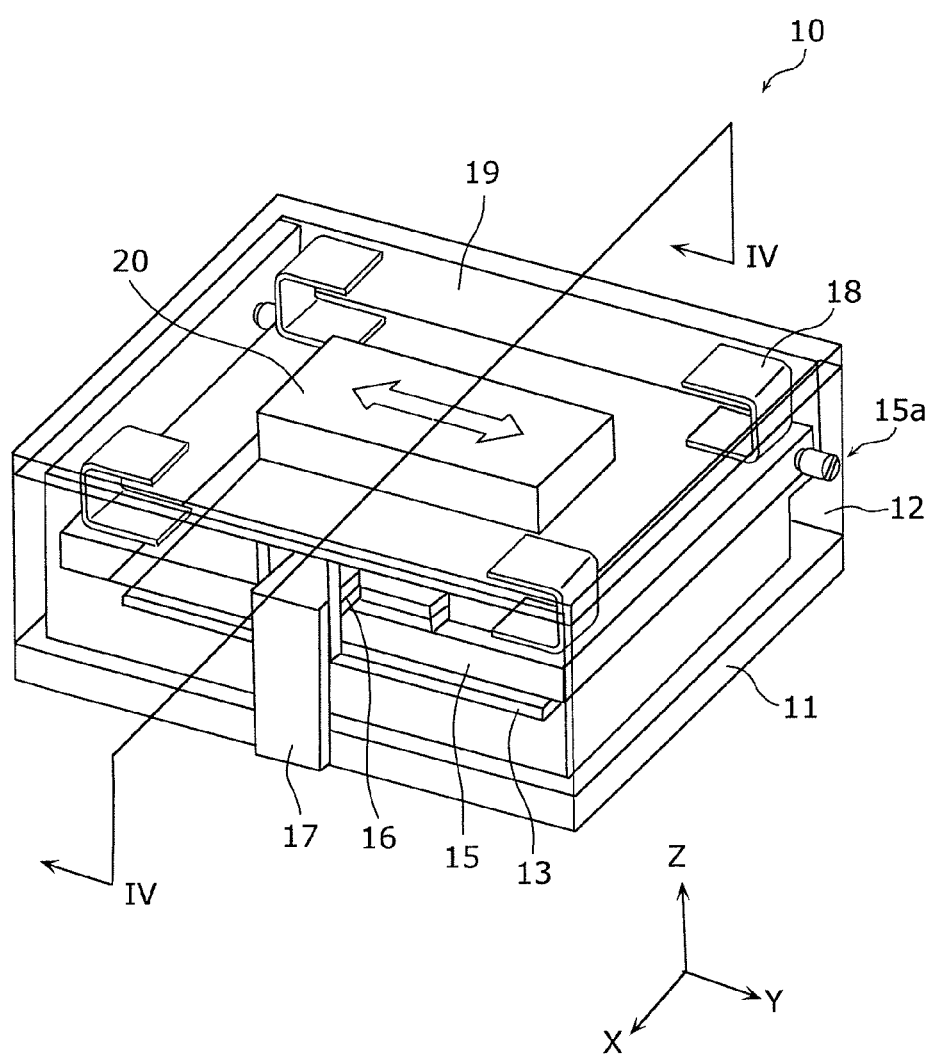
FIG. 2 is a schematic see-through perspective view of the input device according to the embodiment.
Figure 3:
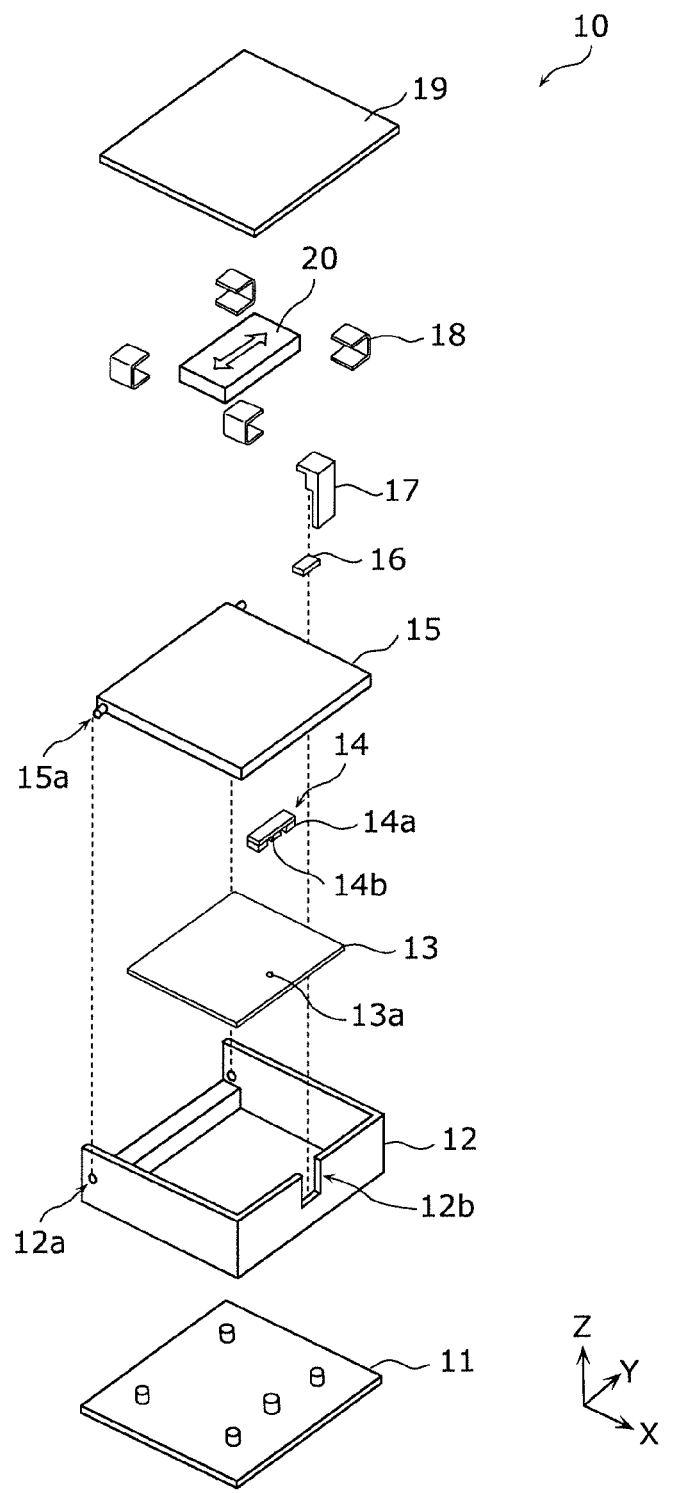
FIG. 3 is an exploded perspective view of the input device according to the embodiment.
Figure 4:
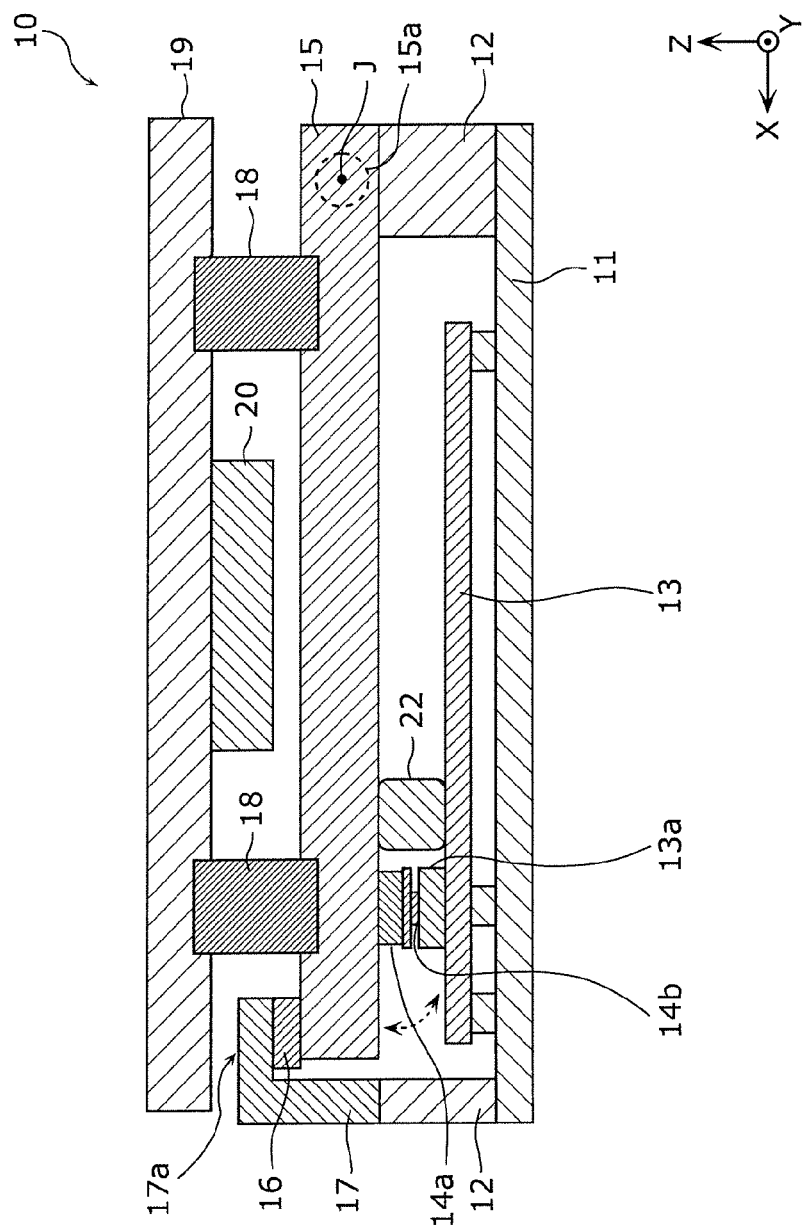
FIG. 4 is a schematic cross-sectional view of the input device according to the embodiment, taken along the line IV-IV shown in FIG. 2.
Figure 5:
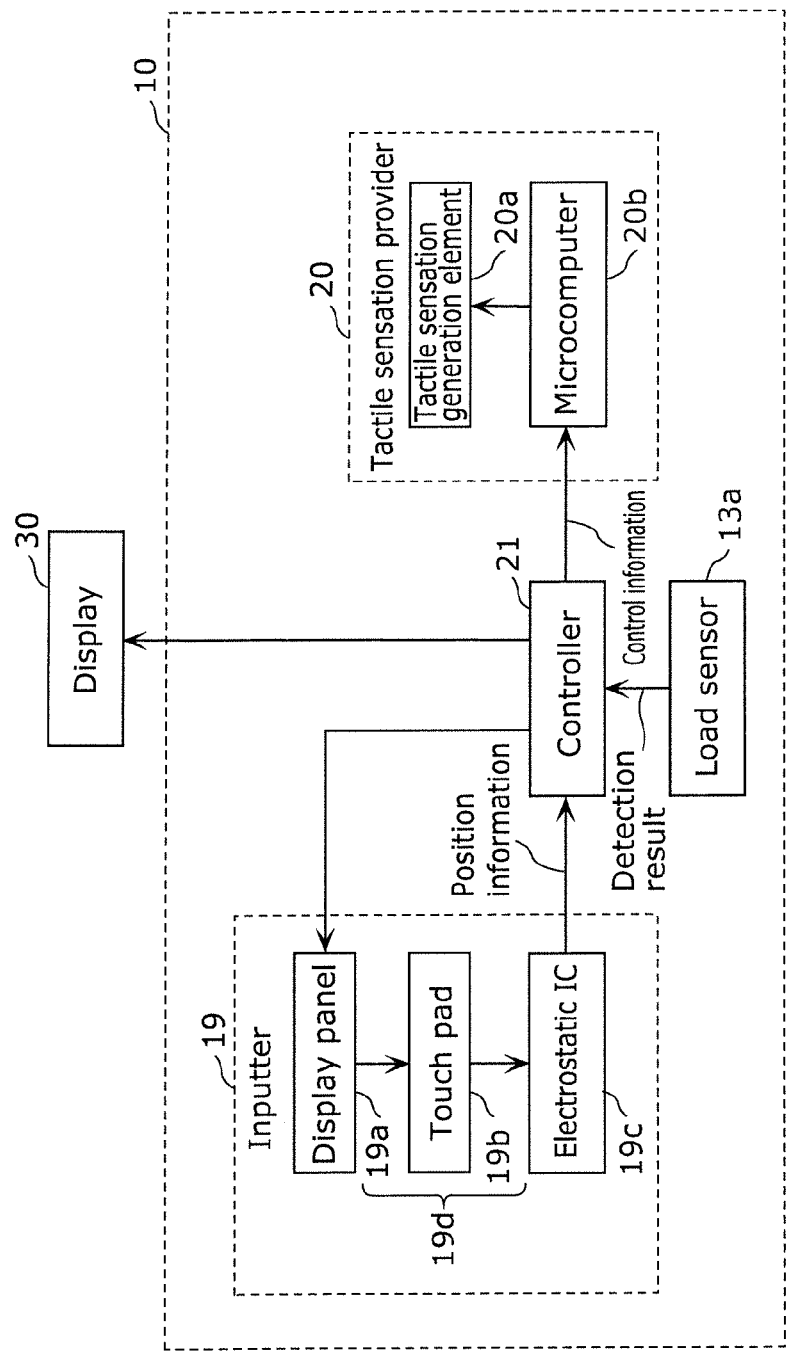
FIG. 5 is a block diagram showing an example of a functional configuration of the input device according to the embodiment.

Next, the configuration of input device 10 will be described with reference to FIGS. 2 to 7B. FIG. 2 is a schematic see-through perspective view of input device 10 according to the present embodiment. FIG. 2 shows an internal structure of input device 10. FIG. 3 is an exploded perspective view of input device 10 according to the present embodiment. FIG. 4 is a schematic cross-sectional view of input device 10 according to the present embodiment, taken along the line IV-IV shown in FIG. 2. FIG. 5 is a block diagram showing an example of a functional configuration of input device 10 according to the present embodiment. FIG. 2 is a diagram in which cover 11, main body 12, and inputter 19 that form the outer appearance of input device 10 are shown as transparent, and each structural element is illustrated using solid lines. Also, FIG. 4 is a schematic cross-sectional view of a state in which inputter 19 does not receive an operation from the user (hereinafter, this state may also be referred to as "initial state").

As shown in FIGS. 2 to 5, input device 10 includes cover 11, main body 12, substrate 13, load sensor 13a, presser 14, frame 15, second elastic body 16, stopper 17, plate springs 18, inputter 19, tactile sensation provider 20, controller 21 (see FIG. 5), and third elastic body 22 (see FIG. 4). Input device 10 is configured such that, when the user operates inputter 19, frame 15, inputter 19, and the like move from the plus side of the Z axis toward the minus side of the Z axis. The direction from the plus side of the Z axis toward the minus side of the Z axis is defined as "first direction". Also, input device 10 is configured such that, when the user stops operating inputter 19, due to first elastic body 14a, frame 15, inputter 19, and the like move from the minus side of the Z axis toward the plus side of the Z axis. The direction from the minus side of the Z axis toward the plus side of the Z axis is defined as "second direction". The first direction and the second direction are opposite directions. Hereinafter, an example will be described in which the operation input by the user is a pressing operation.

As shown in FIGS. 2 and 4, substrate 13, presser 14, a portion of frame 15, second elastic body 16, plate springs 18, and third elastic body 22 are housed in, for example, main body 12. In other words, cover 11, main body 12, a portion of frame 15, stopper 17, and inputter 19 are visually recognized from the outer appearance of input device 10.

As shown in FIG. 3, cover 11 is a plate-like member that is attached to main body 12 so as to close one opening of main body 12. The shape of cover 11 may be determined as appropriate according to the shape of the opening of main body 12. Also, cover 11 includes a plurality of protrusions for supporting substrate 13. Also, cover 11 is made using, for example, a resin material.

Main body 12 is a frame-like member that houses substrate 13, presser 14, a portion of frame 15, second elastic body 16, plate springs 18, third elastic body 22, and the like. In the present embodiment, main body 12 pivotally supports one end of frame 15. Main body 12 includes, for example, holes 12a, and pivotally supports frame 15 as a result of protruding portions 15a of frame 15 being inserted into holes 12a, respectively. With this configuration, as shown in FIG. 4, main body 12 pivotally supports frame 15 about rotation axis J.

Referring back to FIG. 3, the diagram shows an example in which main body 12 has a rectangular frame shape. However, the shape of main body 12 is not limited thereto, and main body 12 may have, for example, a circular shape or any other shape. Also, main body 12 is formed by using, for example, a resin material. Main body 12 is an example of the casing.

Main body 12 and cover 11 may be integrated as a single body. That is, main body 12 may have a bottomed frame-like shape.

Substrate 13 is a plate-like member that is disposed on the first direction side of frame 15. Substrate 13 is disposed, for example, between cover 11 and frame 15 so as to oppose frame 15. Load sensor 13a is mounted on a surface of substrate 13, the surface being on inputter 19 side (hereinafter, also referred to as "upper surface").

Load sensor 13a detects a load applied to inputter 19 based on the movement of frame 15 in the first direction. In the present embodiment, there is no particular limitation on load sensor 13a as long as it is possible to detect a load applied to, for example, inputter 19. Load sensor 13a may be, for example, a piezoelectric sensor. Load sensor 13a includes, for example, a piezoelectric element. Load sensor 13a may be, for example, a stroke sensor that detects a load applied to inputter 19 as the amount of displacement of first elastic body 14a. The stroke sensor detects the amount of displacement of first elastic body 14a as a stroke amount by using, for example, an optical sensor, a radio wave sensor, a sonic sensor, or the like. The stroke sensor can detect a small stroke amount of, for example, about 0.1 mm. The stroke sensor may be configured to determine that the user has pressed inputter 19 by detecting a stroke amount of, for example, about 0.1 mm.

Load sensor 13a may be a contact load sensor, or may be a contactless load sensor.

Upon determining that the user has pressed inputter 19, load sensor 13a outputs the detection result to controller 21 (see FIG. 5).

Load sensor 13a does not need to be mounted on the upper surface of substrate 13. It is sufficient that load sensor 13a is disposed between substrate 13 and frame 15 so as to be capable of detecting a load applied to inputter 19. Load sensor 13a may be disposed between substrate 13 and frame 15 so as to be capable of detecting the amount of deformation of first elastic body 14a.

Presser 14 moves along with the movement of frame 15, and presses load sensor 13a. Presser 14 is disposed on a surface of frame 15, the surface being on substrate 13 side (hereinafter, also referred to as "lower surface"). Presser 14 includes first elastic body 14a and pressing element 14b.

First elastic body 14a is disposed between substrate 13 and frame 15. In the present embodiment, first elastic body 14a is disposed so as to overlap load sensor 13a in a plan view. That is, first elastic body 14a is disposed at least between pressing element 14b and frame 15. First elastic body 14a is compressed by receiving a stress in the downward direction when the user presses inputter 19. When the user stops pressing inputter 19, first elastic body 14a recovers to its original state from the compressed state, and forces frame 15 upward. First elastic body 14a applies a stress in the upward direction to second elastic body 16 when first elastic body 14a recovers to its original state.

Also, first elastic body 14a may be shaped such that pressing element 14b is interposed (in the example shown in FIG. 3, pressing element 14b is interposed between the minus side and the plus side of the Y axis). First elastic body 14a may be shaped to have a recess portion at the position at which pressing element 14b is disposed as viewed in the X axis direction. First elastic body 14a is formed by using, for example, a silicone rubber, a urethane material, or the like.

Pressing element 14b is a portion that abuts against load sensor 13a, and abuts against load sensor 13a in the initial state. Pressing element 14b is formed by using, for example, a conductive material. Pressing element 14b is formed by using, for example, a metal material such as aluminum, nickel, copper or iron, or an alloy material that contains any of these, stainless steel or the like.

Frame 15 is a plate-like member that holds inputter 19 and moves in the first direction (the downward direction) as a result of the user pressing inputter 19. Frame 15 holds inputter 19 via plate springs 18. Also, in the present embodiment, frame 15 pivots about rotation axis 3 as shown in FIG. 4 because one end of frame 15 (for example, the one end being the end on the minus side of the X axis) is pivotally held by main body 12. Specifically, frame 15 moves in the first direction as a result of first elastic body 14a being compressed. In the present embodiment, frame 15 pivots in the first direction as a result of first elastic body 14a and third elastic body 22 being compressed.

As used herein, the term "pivot" refers to an example of movement. The expression "frame 15 pivots about rotation axis J in the downward direction" is equivalent to an example in which frame 15 moves in the first direction. Likewise, the expression "frame 15 pivots in the upward direction" is equivalent to an example in which frame 15 moves in the second direction. Also, frame 15 is an example of the movable portion. Also, frame 15 is formed by using, for example, a resin material.

As shown in FIG. 4, second elastic body 16 is disposed between frame 15 and restrictor 17a such that frame 15 and restrictor 17a do not come into direct contact with each other. In the present embodiment, second elastic body 16 is disposed between another end of frame 15 (for example, the other end being the end on the plus side of the X axis) and restrictor 17a. Second elastic body 16 has a repulsion elasticity lower than that of first elastic body 14a. In the initial state, for example, second elastic body 16 is compressed because it receives a stress in the upward direction by first elastic body 14a. Second elastic body 16 may have at least one of a shape and characteristics that causes substrate 13 and frame 15 to be parallel in the initial state.

Figure 6:
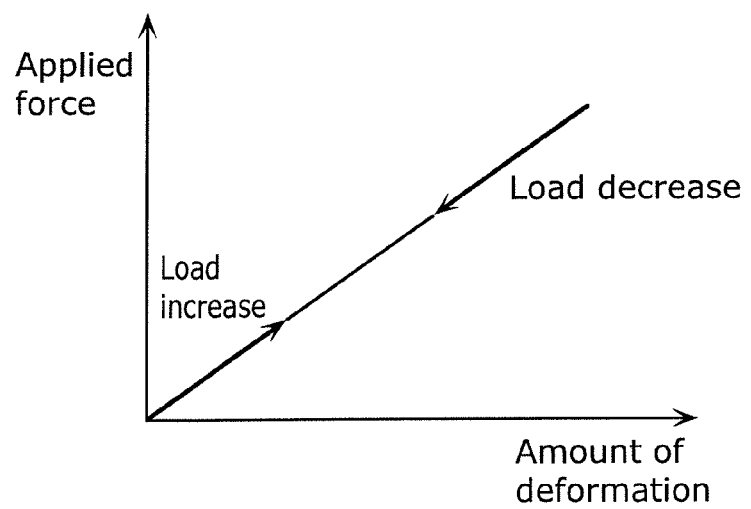
FIG. 6 is diagram showing characteristics of a first elastic body according to the embodiment.
Figure 7A:
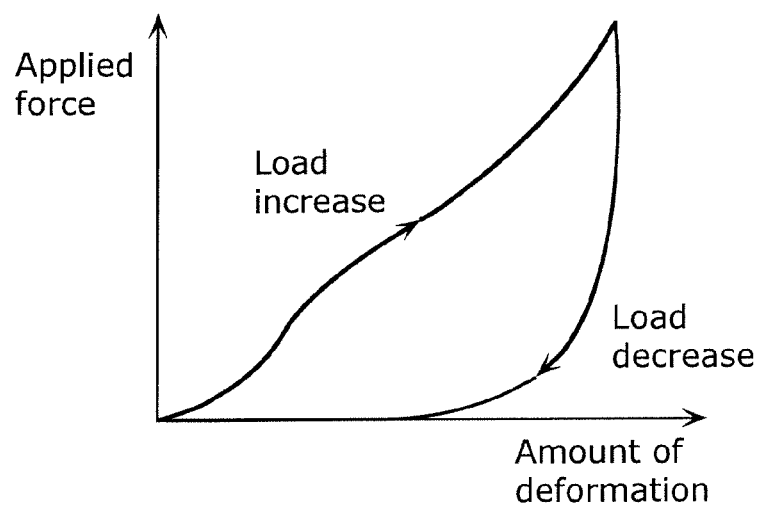
FIG. 7A is a diagram showing characteristics when a second elastic body according to the embodiment is pressed slowly.
Figure 7B:
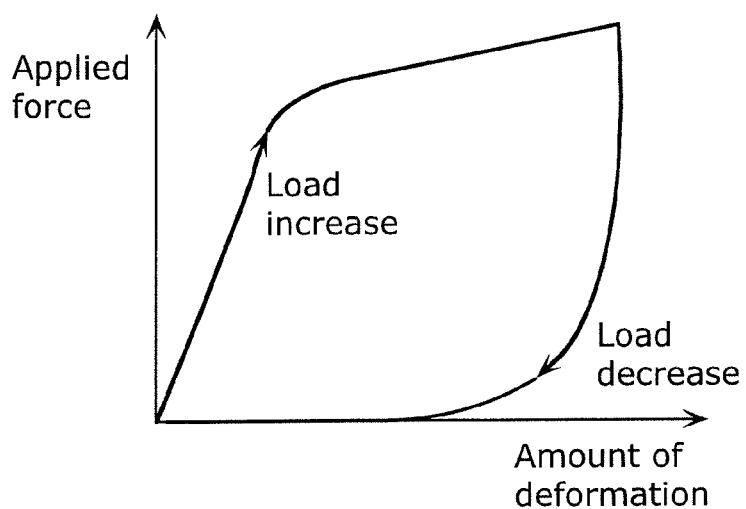
FIG. 7B is a diagram showing characteristics when the second elastic body according to the embodiment is pressed quickly.

A detailed description of second elastic body 16 will now be given here with reference to FIGS. 6 to 7B. For the purpose of comparison, a description of first elastic body 14a will also be given. FIG. 6 is a diagram showing the characteristics of first elastic body 14a according to the present embodiment. FIG. 7A is a diagram showing characteristics when second elastic body 16 according to the present embodiment is pressed slowly. FIG. 7B is a diagram showing characteristics when second elastic body 16 according to the present embodiment is pressed quickly.

As shown in FIG. 6, first elastic body 14a has characteristics in which the applied force (load) applied to first elastic body 14a is proportional to the amount of deformation that occurs when the applied force is applied to first elastic body 14a. For example, in first elastic body 14a, the process of change in the applied force and the amount of deformation (distortion) of first elastic body 14a in a load increase state matches the process of change in the applied force and the amount of deformation of first elastic body 14a when transition is made from the load increase state to a load decrease state. It can be said that the elastic hysteresis of first elastic body 14a is small.

As shown in FIGS. 7A and 7B, second elastic body 16 has characteristics in which the relationship between the applied force (load) applied to second elastic body 16 and the amount of deformation (distortion) that occurs when the applied force is applied to second elastic body 16 takes the form of a loop rather than a linear form. That is, in second elastic body 16, the process of change in the applied force and the amount of deformation of second elastic body 16 in a load increase state is different from the process of change in the applied force and the amount of deformation of second elastic body 16 when transition is made from the load increase state to a load decrease state. It can be said that the elastic hysteresis is larger in second elastic body 16 than in first elastic body 14a.

Also, the relationship between the applied force and the amount of deformation of second elastic body 16 varies depending on how the stress is applied. Specifically, when inputter 19 is pressed slowly, the applied force and the amount of deformation of second elastic body 16 are substantially proportional. However, when inputter 19 is pressed quickly, the amount of change of second elastic body 16 is small relative to the applied force until a certain level of applied force is applied. That is, when an applied force lower than a certain level is applied at a high frequency, the shape of second elastic body 16 is unlikely to change. As used herein, the expression "press slowly" means to press, for example, at such a speed that inputter 19 is pressed by a human. Likewise, the expression "press quickly" means to press, for example, at such a frequency that input device 10 receives vibrations while automobile 1 is running.

Second elastic body 16 has characteristics in which, when inputter 19 is pressed by a human, as shown in FIG. 7A, the amount of deformation is large, but when vibrations while automobile 1 is running are applied, as shown in FIG. 7B, the amount of deformation is reduced as compared with that of when inputter 19 is pressed by a human.

Accordingly, for example, when the user presses inputter 19 with his/her finger and thereafter removes the finger from inputter 19 and stops pressing, due to the elastic force of first elastic body 14a or the like, a stress in the upward direction is applied to second elastic body 16, and, as shown in FIG. 7A, second elastic body 16 deforms in proportion to the stress (the applied force). Also, for example, when a stress in the upward direction at a high frequency such as vibrations while automobile 1 is running is applied, as shown in FIG. 7B, the amount of deformation of second elastic body 16 relative to the stress (the applied force) is small. That is, as a result of second elastic body 16 having a low repulsion elasticity, it is possible to suppress a situation in which frame 15 moves due to external vibrations. Accordingly, even when, for example, automobile 1 is running on a bad condition road while vibrating, input device 10 can accurately detect an operation of pressing inputter 19 by the user.

As described above, the expression "low repulsion elasticity" used in the present disclosure refers to characteristics, as shown in FIGS. 7A and 7B, in which the relationship between the applied force and the amount of deformation takes the form of a loop, and the amount of deformation is reduced as the frequency at which the load is applied increases. For example, second elastic body 16 has characteristics in which the relationship between the applied force and the amount of deformation takes the form of a loop larger than that of first elastic body 14a, and the amount of deformation becomes smaller than that of first elastic body 14a as the frequency at which the load is applied is higher. That is, second elastic body 16 has a repulsion elasticity lower than that of first elastic body 14a.

Second elastic body 16 as described above is formed by using, for example, a so-called low rebound sponge, a sponge that has characteristics as shown in FIGS. 7A and 7B. However, the material that constitutes second elastic body 16 is not limited thereto. It can be said that second elastic body 16 is a viscoelastic body. The low rebound sponge is formed by foaming a silicone rubber, a urethane material, or the like.

The expression "second elastic body 16 has a repulsion elasticity lower than that of first elastic body 14a" may mean that, for example, the modulus of repulsion elasticity of second elastic body 16 determined in accordance with JIS K 6400-3 is lower than that of first elastic body 14a. The modulus of repulsion elasticity of second elastic body 16 may be, for example, about 15% or less.

Referring back to FIG. 3, stopper 17 restricts the movement of frame 15 in the second direction that is opposite to the first direction. Stopper 17 is, for example, L-shaped, and is fixed to recess portion 12b of main body 12. Stopper 17 includes restrictor 17a that restricts the movement of frame 15 in the second direction that is opposite to the first direction.

As shown in FIG. 4, restrictor 17a is disposed so as to, for example, oppose the other end of frame 15. It can be said that restrictor 17a restricts the movement of the other end of frame 15 in the second direction. Restricting portion 17a does not need to be disposed at the other end of frame 15 as long as it is possible to restrict the movement of frame 15 in the second direction.

Stopper 17 is formed by using, for example, a resin material. Also, stopper 17 may be integrated with main body 12 to form a single body.

Plate springs 18 are elastic bodies that are provided between frame 15 and inputter 19 so that frame 15 can support inputter 19. Plate springs 18 have, for example, such an elastic force that does not interrupt the vibrations of inputter 19 provided by tactile sensation provider 20.

Inputter 19 is a user interface to which an operation is input by the user. The user can control the vehicle equipment mounted on automobile 1 by operating inputter 19.

As shown in FIG. 5, inputter 19 includes display panel 19a, touch pad 19b, and electrostatic IC (Integrated Circuit) 19c.

Display panel 19a displays information regarding the onboard equipment that is a control target by being controlled by controller 21. Display panel 19a is implemented by a transparent display device, and displays images, character information, and the like. Display panel 19a may be, for example, a transparent display device in which an organic EL (Electro-Luminescent) panel is used, but display panel 19a is not limited thereto. Inputter 19 does not necessarily include display panel 19a. Input device 10 may receive, for example, control for the onboard equipment displayed on display 30.

Touch pad 19b is a receiver that receives a touch of the user. Touch pad 19b may be, for example, a capacitive touch pad, and is connected to electrostatic IC 19c. Touch pad 19b includes a conductive film.

Touch pad 19b may be a sensor that receives a plurality of touches of the user, or in other words, a multi-touch sensor. That is, touch pad 19b may be configured to receive not only the touch point of one finger, but also two touch points touched by two fingers, three touch points touched by three fingers, or the like, at the same timing.

Touch pad 19b is not limited to the capacitive receiver described above, and may be, for example, an optical receiver that emits light to a finger of the user and detects the contact point of the finger. By using the optical receiver as touch pad 19b, the contact point of a finger can be easily detected based on the reflected light from the finger or the shadow of the finger when light is emitted to the finger.

Alternatively, touch pad 19b may be a resistive touch panel that detects a contact point by using a resistive film provided on touch pad 19b. By using the resistive touch panel as touch pad 19b, the contact point of a finger can be easily detected based on a change in the resistance value of the resistive film provided on touch pad 19b caused by the finger touching touch pad 19b.

Also, touch pad 19b is not limited to those described above, and may be a touch pad of any other type such as an ultrasonic touch pad or an electromagnetic touch pad. As contactless touch pad 19b, an ultrasonic or optical (for example, a camera or the like) contact pad may be used.

A predetermined pattern (icon) used to control the onboard equipment may be formed on touch pad 19b by printing or the like. The predetermined pattern includes, for example, a back switch used to return to the previously displayed content, a menu switch used to display a menu, and the like.

Display panel 19a and touch pad 19b together constitute touch panel 19d. Inputter 19 may include touch panel 19d that detects the operating position of the operation input to inputter 19 by the user.

Electrostatic IC 19c detects a position touched by a part of the body of the user (for example, a finger) in a detection region of touch pad 19b. Electrostatic IC 19c is a sensor that detects a position touched by a finger of the user based on a change in capacitance caused by the user touching the conductive film provided on touch pad 19b. By using such a sensor as electrostatic IC 19c, electrostatic IC 19c can detect the contact point of the finger with high accuracy based on a change in capacitance between the finger of the user and the conductive film. Also, electrostatic IC 19c can detect the position of a finger even in a non-contact manner as long as a change in capacitance between the finger of the user and the conductive film can be detected.

Electrostatic IC 19c outputs position information that indicates the position touched by the user to controller 21. Electrostatic IC 19c is disposed, for example, on a surface opposite to the surface touched by the user.

Tactile sensation provider 20 applies stimulation to the tactile sensation of the user. Tactile sensation provider 20 includes tactile sensation generation element 20a and microcomputer 20b.

Tactile sensation generation element 20a is an element that serves as a source of tactile sensation that is applied to the user according to an input of the user. Tactile sensation generation element 20a provides a tactile sensation to the user based on a vibration waveform input from microcomputer 20b. In the present embodiment, tactile sensation generation element 20a provides tactile sensation vibrations. It can be said that tactile sensation provider 20 has, for example, a vibration applying mechanism. As used herein, the term "tactile sensation vibrations" refers to vibrations generated by tactile sensation provider 20 to provide a tactile sensation. Hereinafter, tactile sensation vibrations may also be referred to simply as vibrations.

Tactile sensation generation element 20a may be a vibrator that provides a tactile sensation directly to the user touching touch pad 19b via vibrations, or may be an element that provides a tactile sensation in a non-contact manner. Also, tactile sensation generation element 20a is not limited to the element that provides a tactile sensation via vibrations, and may be an element that provides a tactile sensation such as another force sensation or a sense of friction to the user, or an element that provides a tactile sensation to the sensory nerve such as an electric current stimulation. In the present embodiment, tactile sensation generation element 20a is a vibrator that generates vibrations, and is an example of the vibration generator.

For example, the vibrator may be a piezoelectric element that includes a piezoelectric body, or may be an element configured to operate electromagnetically such as a motor, a solenoid, or a voice coil. Also, the vibrator may be a linear resonant actuator, an artificial muscle actuator, a shape memory actuator, or the like.

Also, the element that provides a tactile sensation in a non-contact manner may be an element that generates ultrasonic waves or an air flow. The element that provides a tactile sensation to the sensory nerve may be an element that generates a sense of electrostatic friction.

Tactile sensation generation element 20a is disposed on a surface of inputter 19, the surface being on frame 15 side (hereinafter, also referred to as "lower surface"). Specifically, tactile sensation generation element 20a is disposed on the lower surface of touch pad 19b. A conductive plate may be provided between touch pad 19b and tactile sensation generation element 20a. As a result of a conductive plate being provided between touch pad 19b and tactile sensation generation element 20a, in touch pad 19b, noise caused by an electric field received from tactile sensation generation element 20a can be reduced. In FIGS. 2 to 4, the illustration of the conductive plate is omitted.

Microcomputer 20b generates a vibration waveform for vibrating tactile sensation generation element 20a based on control information output from controller 21, and outputs the generated vibration waveform to tactile sensation generation element 20a.

Controller 21 is a control device that controls the structural elements of input device 10. Controller 21 is electrically connected to, for example, load sensor 13a, inputter 19, and tactile sensation provider 20. Controller 21 acquires position information from inputter 19, and acquires a detection result from load sensor 13a. Then, controller 21 generates control information for providing a tactile sensation to the user based on the acquired position information and detection result, and outputs the generated control information to microcomputer 20b. Controller 21 outputs the control information if, for example, controller 21 acquires position information and acquires a detection result that indicates that inputter 19 has been pressed by a load of a predetermined value or more. In other words, controller 21 does not output the control information if, for example, controller 21 acquires only either one of the position information and the detection result. Accordingly, it is possible to suppress a situation in which the user accidentally touches inputter 19 and the onboard equipment malfunctions.

Also, controller 21 may control display 30 according to the position information and the control information. Specifically, controller 21 causes a display screen including an operation screen to be displayed on display 30 of the onboard equipment. Also, if position information that indicates to display a menu is input by inputter 19, controller 21 causes the menu to be displayed on the operation screen of display 30. Controller 21 may cause the screen displayed on display 30 to be displayed on display panel 19a.

Controller 21 may be implemented by, for example, a processor that executes a predetermined program and a memory in which the predetermined program is stored, or may be implemented by a dedicated circuit. Controller 21 may be implemented by, for example, an ECU (Electronic Control Unit).

Referring back to FIG. 4, third elastic body 22 is disposed at a position between substrate 13 and frame 15, the position being different from the position of first elastic body 14a in a cross section. It can be said that third elastic body 22 is disposed at a position that does not overlap load sensor 13a in a plan view. Third elastic body 22 has a thickness (a length in the Z axis direction) larger than, for example, the thickness of first elastic body 14a. Third elastic body 22 abuts against, for example, both substrate 13 and frame 15 in the initial state. Third elastic body 22 may be formed by using the same material as that of first elastic body 14a. Also, third elastic body 22 may be integrated with first elastic body 14a to form a single body.

As described above, input device 10 according to the present embodiment includes: inputter 19 provided for a user to input an operation; frame 15 (an example of the movable portion) that holds inputter 19 and moves in a first direction (for example, downward direction) in response to the operation input by the user; substrate 13 disposed on a side to which frame 15 moves in the first direction; first elastic body 14a disposed between frame 15 and substrate 13; load sensor 13a that detects a load applied to inputter 19 based on the movement of frame 15 in the first direction; restrictor 17a that restricts the movement of frame 15 in a second direction that is opposite to the first direction; and second elastic body 16 disposed between restrictor 17a and frame 15. Second elastic body 16 has a repulsion elasticity lower than that of first elastic body 14a.

Accordingly, in the initial state, second elastic body 16 is compressed by receiving the stress in the upward direction caused by the elastic force of first elastic body 14a. Accordingly, frame 15 does not apply an unnecessary load in the downward direction, and thus the preload applied to load sensor 13a during non-operation state is stabilized. Accordingly, with input device 10, variations in output of load sensor 13a during non-operation state or 13a are suppressed, as a result of which, variations in the pressure range that is detectable by load sensor 13a can be suppressed, and thus the stroke amount reduction can be achieved.

For example, if frame 15 abuts directly against restrictor 17a, due to a dimensional error in the thickness of frame 15 or the like, variations occur in the preload. For this reason, second elastic body 16 that has a repulsion elasticity lower than that of first elastic body 14a is disposed between frame 15 and restrictor 17a. With this configuration, second elastic body 16 can absorb the dimensional error, and thus the preload is stabilized.

For example, examples will be described in which the thickness of frame 15 takes the maximum value within tolerance and in which the thickness of frame 15 takes the minimum value within tolerance. When the thickness of frame 15 takes the maximum value, second elastic body 16 is compressed more than when the thickness of frame 15 takes the minimum value. Accordingly, the load applied to load sensor 13a in the initial state is equal in each input device 10 irrespective of the dimensional error of the thickness of frame 15. Thus, the preload is stabilized.

For example, a conventional mechanical push switch has a maximum stroke amount of about 1 to 2 mm, and a preload of a few millimeters (for example, 2 mm) is applied to suppress variations. Accordingly, it is difficult to reduce the stroke amount.

Also, even if there is a dimensional error in the structural elements of input device 10, due to the change in the degree of compression of second elastic body 16 that has a low repulsion elasticity, the dimensional error is absorbed, which makes it easy to perform dimensional management in mass production. Accordingly, the productivity of input device 10 is improved.

Also, if the preload applied to load sensor 13 varies during non-operation state, the output initial value of load sensor 13a also varies during non-operation state, and thus the output threshold value of load sensor 13a that is used to determine whether or not a pressing operation with a small stroke amount has been performed also varies. As a result, it requires the output threshold value to be set for each individual input device, which makes the logic for determining a pressing operation complex. In contrast, with input device 10 according to the present embodiment, the preload is stabilized due to second elastic body 16 that has a low repulsion elasticity, and thus variations in the output initial value of load sensor 13a during non-operation state are reduced. As a result, the output threshold value of load sensor 13a that is used to determine whether or not a pressing operation with a small stroke amount has been performed is also stabilized. Accordingly, it is unnecessary to set the output threshold value for each individual input device, and thus the productivity of input device 10 is improved.

[2. Operations of Input Device]

Figure 8:
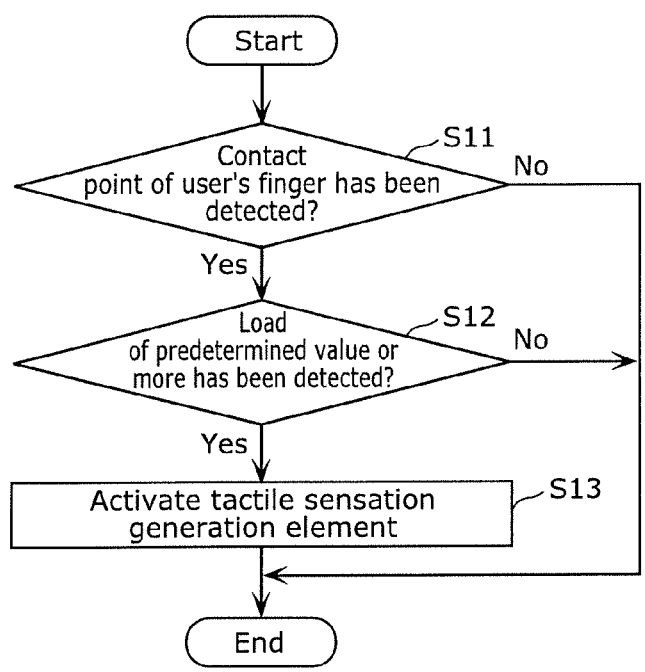
FIG. 8 is a flowchart illustrating an example of operations performed by the input device according to the embodiment.

Next, the operations of input device 10 will be described with reference to FIG. 8. FIG. 8 is a flowchart illustrating an example of operations performed by input device 10 according to the present embodiment.

As shown in FIG. 8, electrostatic IC 19c determines whether or not the contact point of a user's finger has been detected (S11). If the user operates touch pad 19b of inputter 19 with his/her finger, electrostatic IC 19c provided on touch pad 19b detects the position touched by the finger in touch pad 19b based on a change in capacitance of touch pad 19b caused by the finger touching touch pad 19b. Accordingly, the contact point (for example, touch point) of the finger of the user touching touch pad 19b is detected. Information that indicates the detected contact point of the finger (an example of position information) is output from electrostatic IC 19*c* to controller 21. The detection of the contact point of a finger is performed, for example, regularly.

If electrostatic IC 19*c* detects the contact point of a user's finger (Yes in S11), load sensor 13*a* determines whether or not a load of a predetermined value or more has been detected (S12). In the present embodiment, as a result of input device 10 including second elastic body 16 that has a repulsion elasticity lower than that of first elastic body 14*a*, the preload is stabilized, and it is therefore possible to suppress variations in the pressure range that is detectable by load sensor 13*a*. Accordingly, in step S12, load sensor 13*a* can determine whether or not a load of a predetermined value or more has been detected, by using a small stroke amount and with high accuracy.

In the case where load sensor 13*a* is a stroke sensor, whether or not a load of a predetermined value or more has been detected is determined by detecting a stroke of 0.1 mm. Information that indicates that a load of a predetermined value or more has been detected (an example of detection result) is output from load sensor 13*a* to controller 21. The detection of the load of a finger is performed regularly.

If load sensor 13*a* detects a load of a predetermined value or more (Yes in S12), controller 21 activates tactile sensation generation element 20*a* (S13). Controller 21 generates, for example, control information for vibrating tactile sensation generation element 20*a*, and outputs the generated control information to tactile sensation provider 20. Controller 21 may change the form of tactile sensation based on, for example, at least one of the position information and the detection result. Controller 21 may change at least one of the frequency of vibrations, the magnitude of vibrations, the pattern of vibrations based on, for example, at least one of the position information or the detection result.

Then, upon acquiring the control information, microcomputer 20*b* generates a vibration waveform based on the control information, and causes tactile sensation generation element 20*a* to generate a tactile sensation that is applied to the user. In the present embodiment, microcomputer 20*b* vibrates tactile sensation generation element 20*a* based on the control information.

The flowchart shown in FIG. 8 is merely an example. It is sufficient that input device 10 performs the processing operations described in the description of the functional configuration of input device 10. The steps are not necessarily performed in the order shown in FIG. 8, and not all of the steps need to be performed. For example, the order of step S11 and step S12 may be interchanged, or step S11 and step S12 may be performed in parallel. For example, step S11 and step S12 may be performed in synchronization with each other.

Figure 9:
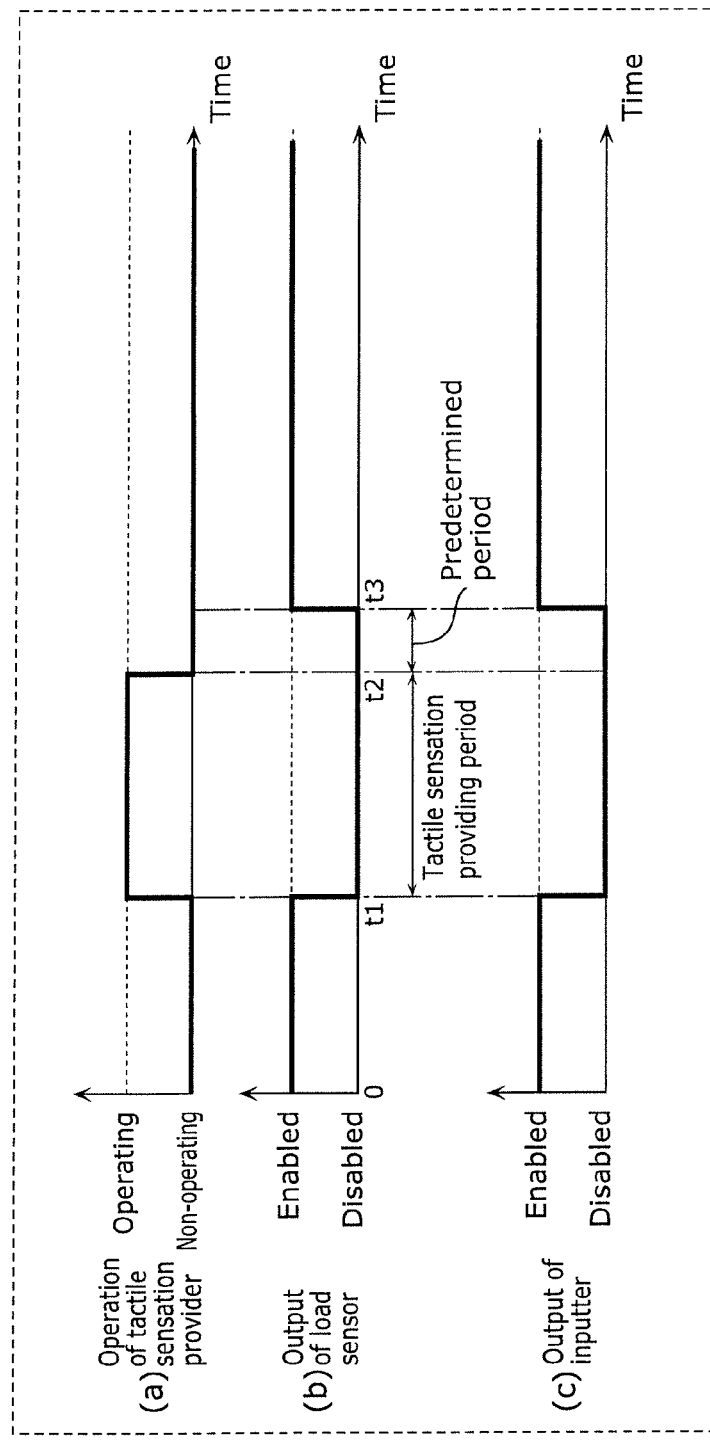
FIG. 9 shows characteristic diagrams with time that show the enabled/disabled state of an output from each of a load sensor and an inputter along with operations of a tactile sensation provider according to the embodiment.

Also, in the embodiment given above, controller 21 may disable the output from load sensor 13*a* during a period in which tactile sensation generation element 20*a* of tactile sensation provider 20 is generating and providing a tactile sensation. Furthermore, controller 21 may enable the output from load sensor 13*a* after a predetermined period passes from the time when tactile sensation generation element 20*a* of tactile sensation provider 20 finishes providing the tactile sensation. The operations performed by controller 21 in this case will be described with reference to FIG. 9. FIG. 9 shows characteristic diagrams with time that show the enabled/disabled state of the output from each of load sensor 13*a* and inputter 19 along with the operation of tactile sensation provider 20 according to the present embodiment. Specifically, (a) in FIG. 9 shows the tactile sensation providing period of tactile sensation provider 20 according to the present embodiment, (b) in FIG. 9 is a characteristic diagram with time that shows the enabled/disabled state of the output from load sensor 13*a*, and (c) in FIG. 9 is a characteristic diagram with time that shows the enabled/disabled state of the output from inputter 19.

Time t1 shown in FIG. 9 is the time when tactile sensation generation element 20*a* of tactile sensation provider 20 starts generating a tactile sensation, and time t2 is the time when tactile sensation generation element 20*a* of tactile sensation provider 20 stops generating the tactile sensation. The period between time t1 and time t2 is the period during which tactile sensation generation element 20*a* of tactile sensation provider 20 generates and provides a tactile sensation, which may also be referred to as tactile sensation providing period. Likewise, time t3 is the time when the outputs from load sensor 13*a* and inputter 19 are switched from a disabled state to an enabled state.

As can be seen from the characteristic diagram with time shown in (a) in FIG. 9 that shows the operation of tactile sensation provider 20, during the tactile sensation providing period in which tactile sensation generation element 20*a* of tactile sensation provider 20 is operating, controller 21 disables the output from load sensor 13*a*, which can be seen from the characteristic diagram with time shown in (b) in FIG. 9, that shows the enabled/disabled state of the output from load sensor 13*a*. At time t1, tactile sensation provider 20 is switched from a non-operating state to an operating state, and the output from load sensor 13*a* is switched from an enabled state to a disabled state. Controller 21 performs control to switch the output from load sensor 13*a* from the enabled state to the disabled state when, for example, tactile sensation provider 20 is switched from the non-operating state to the operating state.

Also, specifically, when the output from load sensor 13*a* is in the disabled state, controller 21 ignores the output from load sensor 13*a*. As used herein, the expression "ignore the output from load sensor 13*a*" means that, for example, during the tactile sensation providing period, even if a detection result of load sensor 13*a* (for example, a detection result that indicates that the user has pressed inputter 19) is acquired, controller 21 does not perform processing that corresponds to the detection result.

Next, at time t2, controller 21 enables the output from load sensor 13*a* after a predetermined period passes from the time when tactile sensation generation element 20*a* of tactile sensation provider 20 stops operating. Controller 21 enables the output from load sensor 13*a* at time t3 that is the time when a predetermined period has passed from time t2. In other words, it can be said that controller 21 disables the output from load sensor 13*a* over the tactile sensation providing period and a predetermined period after the tactile sensation providing period, specifically, for example, over a period from time t1 to time t3.

At time t3, when the output from load sensor 13*a* is switched to the enabled state, controller 21 obtains the output from load sensor 13*a*. For example, upon acquiring a detection result from load sensor 13*a*, controller 21 performs processing that corresponds to the detection result.

Accordingly, during the period in which tactile sensation generation element 20*a* of tactile sensation provider 20 is operating, or in other words, tactile sensation generation element 20*a* is vibrating, controller 21 does not perform vibration control (the operation shown in, for example, FIG. 8) based on the output from load sensor 13*a*. As a result, the input (for example, chattering) to load sensor 13*a* based on an unexpected movement (for example, unintended movement) of a finger caused due to vibrations is suppressed, as a result of which, the occurrence of an erroneous operation can be reduced.

The configuration in which controller 21 disables load sensor 13a is not limited to the configuration in which controller 21 ignores the output from load sensor 13a. For example, a configuration may be possible in which the detection result from load sensor 13a is not output by controller 21 stopping supply of power to load sensor 13a.

Also, as shown in (b) in FIG. 9, controller 21 enables the output from load sensor 13a after a predetermined period (a waiting period) passes, rather than enabling the output from load sensor 13a immediately after tactile sensation generation element 20a of tactile sensation provider 20 stops operating. The predetermined period may be, for example, 0.5 seconds. However, the predetermined period is not limited thereto. The predetermined period may be determined based on a vibration condition of tactile sensation provider 20 or the like, and may be set as appropriate based on the period in which there is a possibility of the occurrence of chattering. The vibration condition includes at least one of vibration intensity, vibration waveform, and vibration duration.

Accordingly, during the predetermined period (for example, for 0.5 seconds) after tactile sensation provider 20 finishes providing the tactile sensation, controller 21 ignores the output from load sensor 13a, and it is therefore possible to suppress the occurrence of an erroneous operation caused by an input to load sensor 13a based on, for example, the inertia of the finger or an unnecessary movement (for example, chattering) of the finger caused by the vibrations of tactile sensation provider 20 irrespective of the fact that the tactile sensation is not provided.

In the foregoing, an example has been described in which the predetermined period is set, but the predetermined period does not need to be set. It is unnecessary to set the predetermined period if, for example, the vibration condition is set to a vibration condition in which an unnecessary movement (for example, chattering) of a finger is unlikely to occur when tactile sensation provider 20 stops providing vibrations. In this case, controller 21 enables the output from load sensor 13a at time t2. For example, controller 21 may perform control to switch the output from load sensor 13a from the disabled state to the enabled state when tactile sensation provider 20 is switched from the operating state to the non-operating state. That is, controller 21 may perform control to disable the output from load sensor 13a at least during the tactile sensation providing period.

Controller 21 disables the output from load sensor 13a during the period in which tactile sensation generation element 20a is operating. In addition thereto, as shown in (c) in FIG. 9, controller 21 may also disable position information from inputter 19. The expression "disable position information" means that controller 21 ignores the output (the position information) from electrostatic IC 19c, and even if, for example, a detection result of electrostatic IC 19c (for example, position information that indicates a position of inputter 19 at which the user has pressed) is acquired during the tactile sensation providing period, controller 21 does not perform processing that corresponds to the detection result.

Accordingly, the possibility of controller 21 obtaining unintended position information caused by an unnecessary movement based on the vibrations of tactile sensation generation element 20a can be reduced. The period in which the position information is disabled may be the same as the period in which the output from load sensor 13a is disabled. For example, if the output from load sensor 13a is disabled over the period from time t1 to time t3, the position information may also be disabled during the period from time t1 to time t3. That is, switching between the enabled state and the disabled state of load sensor 13a and inputter 19 may be performed in synchronization with each other. Specifically, controller 21 switches the output from inputter 19 from the enabled state to the disabled state at the timing when, for example, controller 21 switches the output from load sensor 13a from the enabled state to the disabled state. Likewise, controller 21 switches the output from inputter 19 from the disabled state to the enabled state at the timing when, for example, controller 21 switches the output from load sensor 13a from the disabled state to the enable state.

The configuration in which controller 21 disables electrostatic IC 19c is not limited to the configuration in which controller 21 ignores the output from electrostatic IC 19c. For example, a configuration may be possible in which the detection result from electrostatic IC 19c is not output by controller 21 stopping supply of power to electrostatic IC 19c.

In FIG. 9, an example has been described in which controller 21 switches each of load sensor 13a and inputter 19 between the enabled state and the disabled state along with the operation of tactile sensation provider 20, but controller 21 may switch at least one of load sensor 13a and inputter 19 between the enabled state and the disabled state.

Also, in FIG. 9, an example has been shown in which the predetermined period is shorter than the tactile sensation providing period, but the predetermined period is not limited thereto. For example, the predetermined period may be set to be longer than, shorter than, or the same as the tactile sensation providing period based on the vibration condition.

Variation 1 of Embodiment

Figure 10:
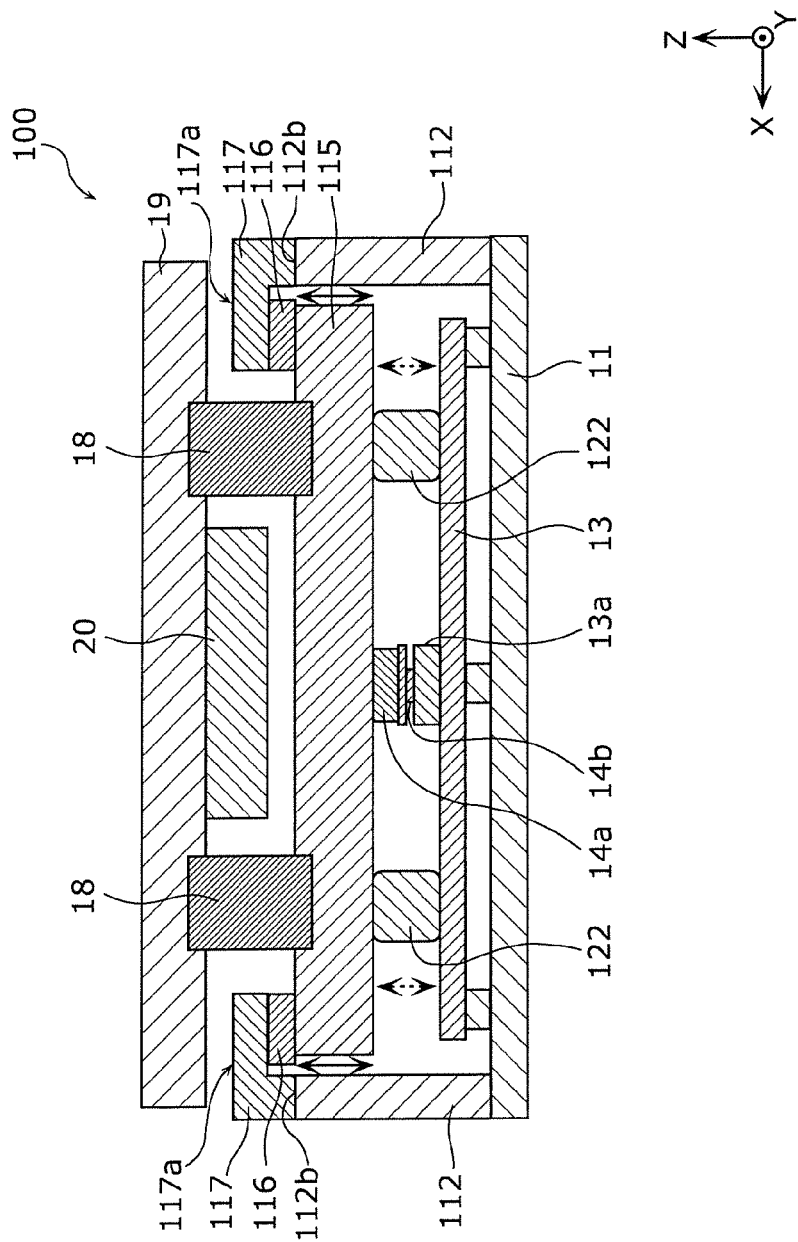
FIG. 10 is a schematic cross-sectional view of an input device according to Variation 1 of the embodiment, taken along the line IV-IV shown in FIG. 2.

Hereinafter, input device 100 according to the present variation will be described with reference to FIG. 10. FIG. 10 is a schematic cross-sectional view of input device 100 according to the present variation, taken along the line IV-IV shown in FIG. 2. Input device 100 according to the present variation is different from input device 10 according to the embodiment primarily in that frame 115 is configured to move in the Z axis direction (the up-down direction). Hereinafter, input device 100 according to the present variation will be described focusing on differences from input device 10 of the embodiment. Also, in the present variation, structural elements that are the same as or similar to those of input device 10 of the embodiment are given the same reference numerals as those of input device 10, and a description thereof will be omitted or simplified. FIG. 10 is a schematic cross-sectional view of input device 100 in the initial state.

As shown in FIG. 10, input device 100 according to the present variation includes cover 11, main body 112, substrate 13, load sensor 13a, presser 14, frame 115, second elastic bodies 116, stoppers 117, plate springs 18, inputter 19, tactile sensation provider 20, and third elastic bodies 122. Input device 100 further includes structural elements such as a controller, but the illustration of the structural elements is omitted in the diagram.

Input device 100 is configured such that frame 115, inputter 19, and the like move from the plus side of the Z axis toward the minus side of the Z axis in response to the user pressing inputter 19. The direction from the plus side of the Z axis toward the minus side of the Z axis is defined as "first direction". Input device 100 is also configured such that frame 115, inputter 19, and the like move from the minus side of the Z axis toward the plus side of the Z axis due to first elastic body 14a in response to the user stopping pressing inputter 19. That is, frame 115, inputter 19, and the like return to their original positions before inputter 19 was pressed by the user. The direction from the minus side of the Z axis toward the plus side of the Z axis is defined as "second direction". The first direction and the second direction are opposite directions. In the present variation, the first direction and the second direction are directions parallel to the Z axis.

Main body 112 is a frame-like member that is configured to support a plurality of stoppers 117. Specifically, main body 112 includes a plurality of recess portions 112b for supporting the plurality of stoppers 117. Main body 112 includes, for example, a plurality of recess portions 112b that are disposed so as to oppose a pair of stoppers 117. Also, in main body 112, holes as described in the embodiment (for example, holes 12a shown in FIG. 3) are not formed. Main body 112 is formed by using, for example, a resin material.

Frame 115 is a plate-like member, and holds inputter 19 and moves in the first direction in response to the user operating inputter 19. In the present variation, frame 115 is pressed in the minus direction of the Z axis (an example of the first direction) in response to the user operating inputter 19. Also, in frame 115, protruding portions as described in the embodiment (for example, protruding portions 15a shown in FIG. 3) are not formed. Frame 115 has, for example, a guide rib configuration (not shown) that restricts the movement of frame 115 in the XY in-plane direction such that frame 115 can move primarily in the Z axis direction. Specifically, for example, ribs may be provided at four positions around the periphery of frame 115, and a guide groove may be formed in main body 112 such that the ribs are fitted into the guide groove. In FIG. 10, regions where the guide ribs are provided are indicated by bidirectional solid arrows.

Frame 115 is not rotatably supported by main body 112. Accordingly, in response to inputter 19 being pressed, first elastic body 14a is compressed, and entire frame 115 moves in the direction in which inputter 19 was pressed. In the present variation, as a result of first elastic body 14a and third elastic bodies 122 being compressed, entire frame 115 moves in the direction in which inputter 19 was pressed. In the present variation, frame 115 moves in the up-down direction (the Z axis direction). The expression "frame 115 is pressed in the downward direction" is equivalent to an example in which frame 115 moves in the first direction, and the expression "frame 115 is pressed in the upward direction" is equivalent to an example in which frame 115 moves in the second direction. Also, frame 115 is an example of the movable portion. Also, frame 115 is formed by using, for example, a resin material.

Second elastic bodies 116 are disposed between frame 115 and restrictors 117a of stoppers 117 such that frame 115 does not come into direct contact with restrictors 117a. In the present variation, each second elastic body 116 is disposed between one of both ends of frame 115 (for example, the both ends being the end on the plus side of the X axis and the end on the plus side of the Y axis) and a corresponding one of restrictors 117a. Second elastic bodies 116 have a repulsion elasticity lower than that of first elastic body 14a. Each second elastic body 116 may have at least one of a shape and characteristics that causes, for example, substrate 13 and frame 115 to be parallel in the initial state. Also, each second elastic body 116 is formed by using, for example, a low rebound sponge.

As a result of second elastic bodies 116 being provided on both ends of frame 115, frame 115 is likely to be maintained in parallel to substrate 13. For example, even if one of the ends of frame 115 is thick and the other end of frame 115 is thin, second elastic body 116 disposed at the one end is compressed significantly, and second elastic body 116 disposed at the other end is less compressed. Accordingly, even if there is a dimensional error in frame 115, the distance between substrate 13 and frame 115 can be kept constant. That is, variations in pressure applied to load sensor 13a caused by a dimensional error in the initial state can be suppressed.

Stoppers 117 restrict the movement of frame 115 in the second direction that is opposite to the first direction. Stoppers 117 are, for example, L-shaped, and are fixed to recess portions 112b of main body 112. In the present variation, stoppers 117 restrict the movement of frame 115 in the second direction at both ends of frame 115. That is, input device 100 includes a plurality of stoppers 117.

Each stopper 117 includes restrictor 117a that restricts the movement of frame 115 in the second direction that is opposite to the first direction. Restricting portions 117a are disposed, for example, on one end of frame 115 and the other end of frame 115, respectively so as to oppose the one end of frame 115 and the other end of frame 115. It can be said that restrictors 117a restrict the movement of the one end of frame 115 and the other end of frame 115 in the second direction. Restricting portions 117a are not necessarily disposed on both ends of frame 115 as long as it is possible to restrict the movement of frame 115 in the second direction. Also, frame 115 is formed by using, for example, a resin material.

A plurality of third elastic bodies 122 are disposed between substrate 13 and frame 115 such that first elastic body 14a is interposed between the plurality of third elastic bodies 122 in a cross section. Third elastic bodies 122 abut against, for example, both substrate 13 and frame 115 in the initial state. Third elastic bodies 122 may be formed by using the same material as that of first elastic body 14a. Also, third elastic bodies 122 may be integrated with first elastic body 14a to form a single body.

As described above, input device 100 according to the present variation is configured such that frame 115 (an example of the movable portion) is pressed in the first direction (the downward direction) by the user performing a pressing operation. Second elastic bodies 116 are disposed between one end of frame 115 and a corresponding one of restrictors 117a and between the other end of frame 115 and the other corresponding one of restrictors 117a.

Accordingly, even in the case where input device 100 is configured such that entire frame 115 is pressed in response to the user pressing inputter 19, in the initial state, frame 115 does not apply an unnecessary load in the downward direction, and thus the preload is stabilized. Thus, with input device 100, variations in the pressure range that is detectable by load sensor 13a can be suppressed, as a result of which, the stroke amount reduction can be achieved.

Also, even if there is a dimensional error in the structural elements of input device 100, the plurality of second elastic bodies 116 that have a low repulsion elasticity absorb the error, which makes it easy to perform dimensional management in mass production. Accordingly, the productivity of input device 100 is improved.

Variation 2 of Embodiment

Hereinafter, input device 200 according to the present variation will be described with reference to FIG. 11. FIG.

11 is a schematic cross-sectional view of input device 200 according to the present variation. Input device 200 according to the present variation is different from input device 10 according to the embodiment primarily in that a mechanical push switch is used. FIG. 11 is a schematic cross-sectional view of input device 200 in the initial state.

Figure 11:
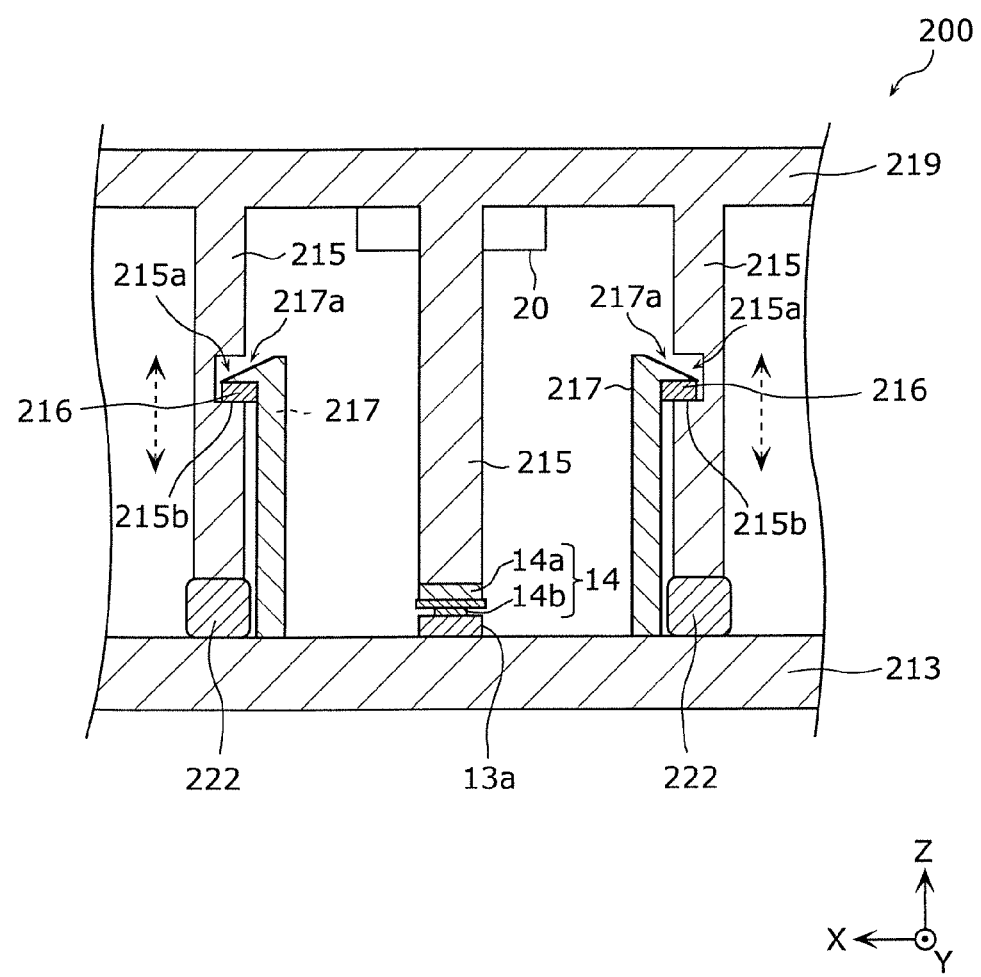
FIG. 11 is a schematic cross-sectional view of an input device according to Variation 2 of the embodiment.

As shown in FIG. 11, input device 200 according to the present variation includes substrate 213, load sensor 13a, presser 14, frame 215, second elastic bodies 216, stoppers 217, inputter 219, tactile sensation provider 20, and third elastic bodies 222. Input device 200 further includes structural elements such as a controller, but the illustration of the structural elements is omitted in the diagram.

Input device 200 is configured such that frame 215, inputter 219, and the like move from the plus side of the Z axis toward the minus side of the Z axis in response to the user operating (pressing) inputter 219. The direction from the plus side of the Z axis toward the minus side of the Z axis is defined as "first direction". Input device 200 is also configured such that frame 215, inputter 219, and the like move from the minus side of the Z axis toward the plus side of the Z axis due to first elastic body 14a in response to the user stopping operating (pressing) inputter 219. The direction from the minus side of the Z axis toward the plus side of the Z axis is defined as "second direction". The first direction and the second direction are opposite directions. In the present variation, the first direction and the second direction are directions parallel to the Z axis.

Substrate 213 is a plate-like member, and is disposed on the first direction side of frame 215. Load sensor 13a is mounted on a surface of substrate 213, the surface being on inputter 219 side (hereinafter, also referred to as "upper surface").

Frame 215 is a columnar member, and holds inputter 219 and moves in the first direction in response to the user operating inputter 219. In the present variation, frame 215 is pressed in the minus direction of the Z axis (an example of the first direction) in response to the user operating inputter 219. In response to the user stopping operating inputter 219, frame 215 is pressed in the plus direction of the Z axis (an example of the second direction) due to first elastic body 14a.

Frame 215 moves in the up-down direction (the Z axis direction). In response to first elastic body 14a being compressed, entire frame 215 moves in a direction in which inputter 219 was pressed. In the present variation, in response to first elastic body 14a and third elastic bodies 122 being compressed, entire frame 215 moves in the direction in which inputter 219 was pressed. The expression "frame 215 is pressed in the downward direction" is equivalent to an example in which frame 215 moves in the first direction, and the expression "frame 215 is pressed in the upward direction" is equivalent to an example in which frame 215 moves in the second direction. Also, frame 215 is an example of the movable portion.

In the present variation, frame 215 is composed of three frames 215. Center frame 215 is provided to apply a load to load sensor 13a by being pressed in response to the user pressing inputter 219. Frames 215 on both sides (right-hand frame 215 and left-hand frame 215 in the plane of paper) are provided to restrict, for example, the movement of center frame 215 in the second direction. In each of frames 215 on both sides, recess portion 215a is formed. At least a portion of second elastic body 216 and restrictor 217a is located in recess portion 215a. There is no particular limitation on the number of frames 215, and frame 215 may be composed of only one frame 215, or may be composed of four or more frames 215.

Frame 215 may be integrated with inputter 219 to form a single body, or may be formed as a separate body from inputter 219. Also, frame 215 is formed by using, for example, a resin material.

Second elastic bodies 216 are disposed between frame 215 and restrictors 217a of stoppers 217 such that frame 215 does not come into direct contact with restrictors 217a. In the present variation, at least a portion of each second elastic body 216 is disposed in recess portion 215a formed in frame 215. Each second elastic body 216 is disposed between lower surface 215b of recess portion 215a and restrictor 217a. Second elastic bodies 216 have a repulsion elasticity lower than that of first elastic body 14a. Each second elastic body 216 may have at least one of a shape and characteristics that causes, for example, substrate 213 and inputter 219 to be parallel in the initial state. Also, each second elastic body 216 is formed by using, for example, a low rebound sponge.

Second elastic body 216 being disposed between right-hand frame 215 (that is provided, for example, on one end side) and restrictor 217a is equivalent to an example in which, for example, second elastic body 216 is disposed between one end of frame 215 and restrictor 217a. Likewise, second elastic body 216 being disposed between left-hand frame 215 (that is provided, for example, on the other end side) and restrictor 217a is equivalent to an example in which, for example, second elastic body 216 is disposed between the other end of frame 215 and restrictor 217a.

As a result of two or more (for example, four) second elastic bodies 216 being provided, for example, inputter 219 is likely to be maintained in parallel to substrate 213. For example, in the case where one of frames 215 on both sides has a height higher than the height of the other one of frames 215 (the height being the length in the direction in which frames 215 extend), second elastic body 216 disposed in one of frames 215 on both sides is compressed significantly, and second elastic body 216 disposed in the other one of frames 215 on both sides is less compressed. Accordingly, even if there is a dimensional error in frames 215, inputter 219 is likely to be maintained in parallel to substrate 213. That is, with input device 200, variations in pressure applied to load sensor 13a caused by a dimensional error in the initial state can be suppressed.

Stoppers 217 restrict the movement of frames 215 in the second direction that is opposite to the first direction. Stoppers 217 are, for example, L-shaped ribs, and are provided to protrude from substrate 213 toward inputter 219 side. In the present variation, stoppers 217 restrict the movement of frames 215 on both sides in the second direction. That is, input device 200 includes a plurality of stoppers 217. Also, stoppers 217 are formed by using, for example, a resin material.

Each stopper 217 includes restrictor 217a that restricts the movement of frame 215 in the second direction that is opposite to the first direction. At least a portion of restrictor 217a is disposed in recess portion 215a of frame 215. Restricting portions 217a are not necessarily disposed in frames 215 on both sides as long as it is possible to restrict the movement of frames 215 in the second direction.

Inputter 219 is a user interface to which an operation is input by the user. The user can control the vehicle equipment mounted on automobile 1 by operating inputter 219. Inputter 219 may be, for example, a plate-like member. Inputter 219 is formed by using, for example, a resin material.

A plurality of third elastic bodies 222 are disposed between substrate 213 and frame 215 such that first elastic body 14a is interposed between the plurality of third elastic bodies 222 in a cross section. Third elastic bodies 222 abut against, for example, both substrate 213 and frame 215 in the initial state. Input device 200 does not necessarily include third elastic bodies 222 as long as frame 215 is configured to be capable of moving in the up-down direction. Also, third elastic bodies 222 may be formed by using the same material as that of first elastic body 14a. Also, third elastic bodies 222 may be integrated with first elastic body 14a to form a single body.

As described above, input device 200 according to the present variation is configured such that frame 215 (an example of the movable portion) is pressed in the first direction (the downward direction) in response to an operation of the user. Each second elastic body 216 is disposed between lower surface 215b of recess portion 215a of frame 215 and restrictor 217a.

Even with input device 200 configured as described above, frame 215 does not apply an unnecessary load in the downward direction, and thus the preload is stabilized. Accordingly, with input device 200, even when a mechanical push switch is used, variations in the pressure range that is detectable by load sensor 13a can be suppressed, as a result of which, the stroke amount reduction can be achieved.

Also, even if there is a dimensional error in the structural elements of input device 200, the plurality of second elastic bodies 216 that have a low repulsion elasticity absorb the error, which makes it easy to perform dimensional management in mass production. Accordingly, the productivity of input device 200 is improved.

OTHER EMBODIMENTS

The input device and the like according to one or more aspects of the present disclosure have been described above by way of the embodiment and the like. However, the present disclosure is not limited to the embodiment and the like given above. The aspect of the present disclosure may also encompass other embodiments obtained by making various modifications that can be conceived by a person having ordinary skill in the art to the above embodiment as well as embodiments implemented by any combination of the structural elements of different embodiments without departing from the scope of the aspect of the present disclosure.

For example, in the input device according to the embodiment given above, the controller may be configured to control the magnitude of tactile sensation vibrations provided by the tactile sensation provider, or may be configured to control the frequency of tactile sensation vibrations, the pattern of tactile sensation vibrations, the type of tactile sensation, or the like. Also, the controller may be configured to perform control to not generate tactile sensation vibrations.

Also, in the embodiment and the like given above, the input device is disposed on the rear side of the shift lever in the cabin of the vehicle, but the position of the input device is not limited thereto. It is sufficient that the input device is disposed at a position within the range that can be reached by a hand of the user. For example, the input device may be disposed in the center console or the instrument panel.

Also, in the embodiment given above, the input device is used to input an operation of the onboard equipment as an example. However, the input device is not limited to an input device for onboard equipment, and may be used to input an operation of another equipment while the user is performing another operation.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: Japanese Patent Application No. 2019-214132 filed on Nov. 27, 2019 and Japanese Patent Application 2020-098744 filed on Jun. 5, 2020.

INDUSTRIAL APPLICABILITY

The present disclosure is useful as an input device, an input device for onboard equipment, or the like that can detect an operation of the user with a small stroke amount.

The invention claimed is:
1. An input device, comprising:
an inputter to which a pressing operation is input by a user;
a movable portion that holds the inputter and moves in a first direction in response to the pressing operation, which presses the inputter in the first direction, being input by the user;
a substrate disposed on a side of the moveable portion to which the movable portion moves in the first direction;
a first elastic body disposed between the movable portion and the substrate;
a load sensor that detects a load applied to the inputter, based on the movement of the movable portion in the first direction;
a restrictor disposed on a side of the moveable portion to which the movable portion moves in a second direction that is opposite to the first direction and that restricts the movement of the movable portion in the second direction; and
a second elastic body disposed between the restrictor and at least part of the movable portion,
wherein the second elastic body has a repulsion elasticity lower than a repulsion elasticity of the first elastic body.
2. The input device according to claim 1, further comprising:
a casing that pivotally supports a first end of the movable portion,
wherein the second elastic body is disposed between the restrictor and a second end of the movable portion.
3. The input device according to claim 1,
wherein
the second elastic body is disposed between each of a first end and a second end of the movable portion and the restrictor.
4. The input device according to claim 1, further comprising:
a tactile sensation provider that provides a tactile sensation to the user via the inputter when the load sensor detects a load of a predetermined value or more.

5. The input device according to claim 4,
wherein the tactile sensation includes vibrations, and
the tactile sensation provider includes a vibration generator that generates the vibrations.

6. The input device according to claim 4, further comprising:
a controller that is electrically connected to the load sensor and the tactile sensation provider,
wherein the controller disables an output from the load sensor during a period in which the tactile sensation provider is providing the tactile sensation.

7. The input device according to claim 6,
wherein the controller enables the output from the load sensor after a predetermined period passes from a time when the tactile sensation provider finishes providing the tactile sensation.

8. The input device according to claim 1,
wherein the inputter includes a touch panel that detects an operating position of the pressing operation that is input to the inputter by the user.

9. The input device according to claim 1,
wherein the load sensor is a stroke sensor that detects a displacement of the first elastic body.

10. The input device according to claim 1,
wherein the first elastic body is disposed to overlap the load sensor in a plan view from the first direction, and
the input device further comprises a third elastic body that is disposed at a position that does not overlap the load sensor in the plan view, the third elastic body being thicker than the first elastic body.

11. The input device according to claim 10,
wherein the first elastic body and the third elastic body are integrated as a single body.

12. The input device according to claim 1,
wherein elastic hysteresis is larger in the second elastic body than in the first elastic body.

13. The input device according to claim 1,
wherein, an amount of deformation of the second elastic body caused by the inputter being pressed at a first speed is larger than an amount of deformation of the second elastic body caused by the inputter being pressed at a second speed, with the second speed being is faster than the first speed, and
the amount of deformation of the second elastic body that is caused by the inputter being pressed at the first speed is in response to the user stopping the pressing operation, which presses the inputter.

14. The input device according to claim 6,
wherein the controller further disables an output from the inputter during the period in which the tactile sensation provider is providing the tactile sensation.

15. The input device according to claim 1,
wherein the first elastic body is disposed to overlap the load sensor in a plan view from the first direction,
the input device further comprises a pressing element that is disposed between the first elastic body and the load sensor and that abuts the load sensor,
the pressing element comprises a conductive material, and
a portion of the first elastic body is disposed such that the pressing element is interposed in the plan view from the first direction.

16. The input device according to claim 6,
wherein the inputter includes a touch panel that detects an operating position of the pressing operation that is input to the inputter by the user, and
a vibration generator is disposed on a surface of the touch panel, the surface being on a side of the touch panel on which the movable portion is provided.

17. The input device according to claim 1, comprising:
a pair of the restrictors disposed on both end sides of the movable portion in a plan view from the first direction;
a pair of the second elastic bodies disposed between the pair of the restrictors and the movable portion; and
a pair of third elastic bodies that are disposed between the movable portion and the substrate and that are thicker than the first elastic body,
wherein the first elastic body that is disposed to overlap the load sensor in a plan view from the first direction is disposed between the pair of third elastic bodies.

18. The input device according to claim 1,
wherein the load sensor is a piezoelectric sensor that detects a load applied to the inputter.

19. A vehicle, comprising:
the input device according to claim 1; and
onboard equipment operated in response to an input to the input device.

20. The vehicle according to claim 19, further comprising:
a shift lever,
wherein the input device is disposed on a rear side of the shift lever.

* * * * *